US008525647B2

(12) United States Patent
Varpula et al.

(10) Patent No.: US 8,525,647 B2
(45) Date of Patent: Sep. 3, 2013

(54) MEASUREMENT SYSTEM, MEASUREMENT METHOD AND NEW USE OF ANTENNA

(75) Inventors: Timo Varpula, Vantaa (FI); Kaj Nummila, Espoo (FI); Kaarle Jaakkola, Helsinki (FI); Pentti Lajunen, Kotka (FI)

(73) Assignee: Valtion Teknillinen Tutkimiskeskus, Espoo (FI)

( * ) Notice: Subject to any disclaimer, the term of this patent is extended or adjusted under 35 U.S.C. 154(b) by 855 days.

(21) Appl. No.: 11/988,235

(22) PCT Filed: Jun. 30, 2006

(86) PCT No.: PCT/FI2006/050305
§ 371 (c)(1), (2), (4) Date: Apr. 29, 2008

(87) PCT Pub. No.: WO2007/003711
PCT Pub. Date: Jan. 11, 2007

(65) Prior Publication Data
US 2009/0160612 A1 Jun. 25, 2009

(30) Foreign Application Priority Data
Jul. 4, 2005 (FI) ..................................... 20050709
Jan. 13, 2006 (FI) ..................................... 20060029

(51) Int. Cl.
*H04Q 5/22* (2006.01)
*H01Q 1/38* (2006.01)
*H01Q 11/02* (2006.01)

(52) U.S. Cl.
USPC ................ 340/10.2; 340/572.1; 343/700 MS; 343/737; 343/847

(58) Field of Classification Search
USPC .................... 340/10.1, 10.2, 572.7, 928, 941; 343/700 MS, 810, 824, 702, 846, 847, 772, 343/825, 826
See application file for complete search history.

(56) References Cited

U.S. PATENT DOCUMENTS 2,247,757 A * 7/1941 Jachnow ....................... 343/731
3,005,201 A * 10/1961 Rotman ........................ 343/772

(Continued)

FOREIGN PATENT DOCUMENTS

WO WO-2004104961 A1 12/2004
WO WO-2005028203 A1 3/2005

OTHER PUBLICATIONS

Oliner et al. (Non-Patent Literature “Microstrip Leaky Wave Strip Antennas”); A. A. Oliner and K. S. Lee; Polytechnic Institute of New York; © 1986 IEEE).*

(Continued)

*Primary Examiner* — Steven Lim
*Assistant Examiner* — Stephen Burgdorf
(74) *Attorney, Agent, or Firm* — Birch, Stewart, Kolasch & Birch, LLP

(57) ABSTRACT

The invention relates to a measuring system for detecting radio-frequency tags, a measuring method, and a new use for a leaky waveguide. The measuring system comprises a reading device and an antenna, which is connected to reading device for connecting to the tags. According to the invention, the antenna is a microstrip-type leaky waveguide having a length which is several times the operating wavelength of the tags. The invention permits reliable and precise RFID detection, for example, for a results service for sports events.

42 Claims, 13 Drawing Sheets

(56) References Cited

U.S. PATENT DOCUMENTS

Figure 1:
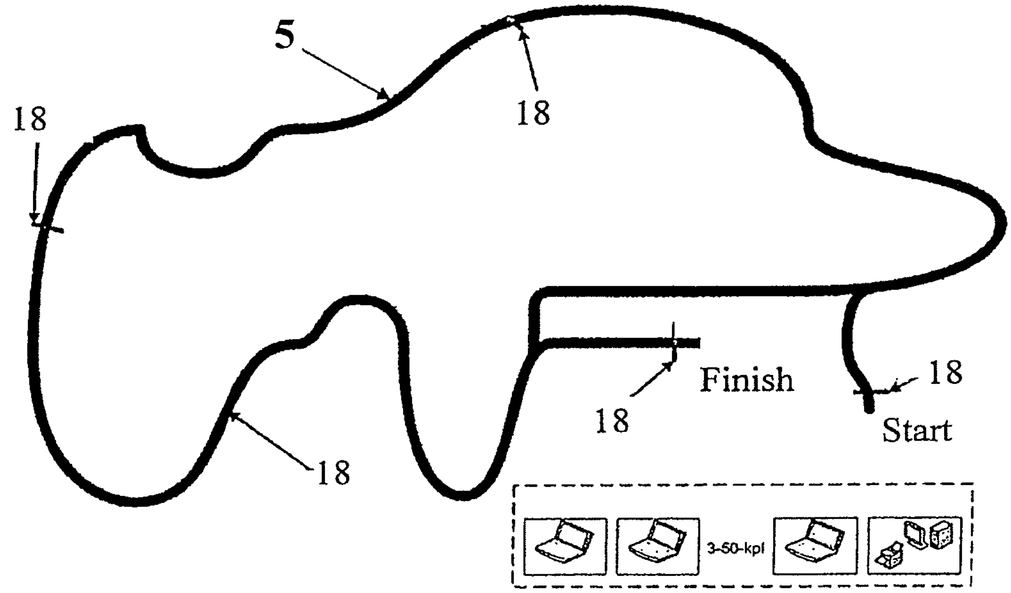

| | | | | | |
|---|---|---|---|---|---|
| 3,302,207 | A * | 1/1967 | Hoffman | 343/731 |
| 3,643,262 | A * | 2/1972 | Dumanchin | 343/846 |
| 3,890,615 | A * | 6/1975 | Moran | 342/28 |
| 4,021,810 | A * | 5/1977 | Urpo et al. | 343/731 |
| 4,335,385 | A * | 6/1982 | Hall | 343/700 MS |
| 4,459,593 | A * | 7/1984 | Hall et al. | 343/700 MS |
| 4,459,594 | A * | 7/1984 | Hall et al. | 343/700 MS |
| 4,475,107 | A * | 10/1984 | Makimoto et al. | 343/700 MS |
| 4,933,679 | A * | 6/1990 | Khronopulo et al. | 343/700 MS |
| 5,155,493 | A * | 10/1992 | Thursby et al. | 343/700 MS |
| 5,192,954 | A * | 3/1993 | Brockelsby et al. | 342/42 |
| 5,196,846 | A * | 3/1993 | Brockelsby et al. | 340/10.51 |
| 5,422,649 | A * | 6/1995 | Huang | 343/700 MS |
| 5,504,466 | A * | 4/1996 | Chan-Son-Lint et al. | 333/159 |
| 5,526,004 | A * | 6/1996 | Antipov et al. | 343/700 MS |
| 5,581,256 | A * | 12/1996 | McEwan | 342/27 |
| D383,464 | S * | 9/1997 | Myers | D14/230 |
| 5,737,280 | A | 4/1998 | Kokubo | |
| 6,005,520 | A * | 12/1999 | Nalbandian et al. | 343/700 MS |
| 6,025,808 | A * | 2/2000 | Mileski | 343/749 |
| 6,154,175 | A * | 11/2000 | Yee | 343/700 MS |
| 6,269,302 | B1 * | 7/2001 | Yoshida | 701/207 |
| 6,509,873 | B1 * | 1/2003 | Nalbandian et al. | 343/700 MS |
| 6,839,030 | B2 * | 1/2005 | Noujeim | 343/700 MS |
| 6,965,279 | B2 * | 11/2005 | Carson | 333/116 |
| 7,030,762 | B2 * | 4/2006 | Hartmann et al. | 340/572.7 |
| 7,109,928 | B1 * | 9/2006 | Thiele et al. | 343/700 MS |
| 2002/0005807 | A1 * | 1/2002 | Sheen | 343/700 MS |
| 2003/0080911 | A1 * | 5/2003 | Schuneman et al. | 343/767 |
| 2003/0098815 | A1 * | 5/2003 | Teshirogi et al. | 343/772 |
| 2004/0006445 | A1 * | 1/2004 | Paek | 702/178 |
| 2004/0074966 | A1 | 4/2004 | Holzer | |
| 2004/0100566 | A1 | 5/2004 | Valleriano et al. | |
| 2005/0012667 | A1 * | 1/2005 | Noujeim | 343/700 MS |
| 2005/0046514 | A1 * | 3/2005 | Janoschka | 333/156 |
| 2005/0093737 | A1 * | 5/2005 | Schoebel | 342/175 |
| 2005/0274799 | A1 * | 12/2005 | Torchalski et al. | 235/432 |
| 2006/0132312 | A1 * | 6/2006 | Tavormina | 340/572.7 |
| 2006/0145861 | A1 * | 7/2006 | Forster et al. | 340/572.7 |
| 2007/0004363 | A1 * | 1/2007 | Kusaka et al. | 455/269 |
| 2007/0176781 | A1 * | 8/2007 | Brown et al. | 340/572.1 |
| 2007/0268143 | A1 * | 11/2007 | Copeland et al. | 340/572.7 |

OTHER PUBLICATIONS

Oliner et al. (Non-Patent Literature “The Nature of Leakage from Higher Modes on Microstrip Line”); A. A. Oliner and K. S. Lee; Polytechnic Institute of New York; © 1986 IEEE.*

“Tests for a timing module for sports timing”, Trolley Scan (Pty( ) Ltd; pp. 1-3, (Jun. 2004).

“An Aperture-Coupled Linear Microstrip Leaky-Wave Antenna Array with Two-Dimensional Dual-Beam Scanning Capability” by Hu et al., IEEE Transactions on Antennas and Propagation, vol. 48, No. 6, Jun. 2000.

European Patent Office Supplementary Search Report for EP 06764543 dated Jun. 10, 2011.

* cited by examiner

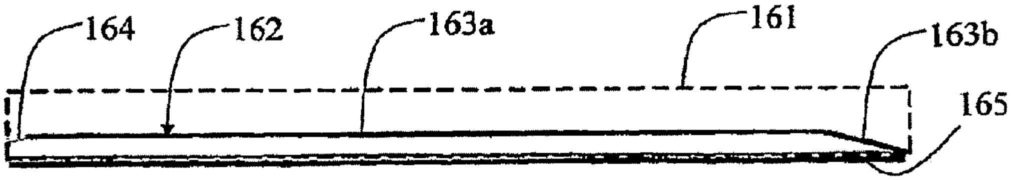
Fig. 16a
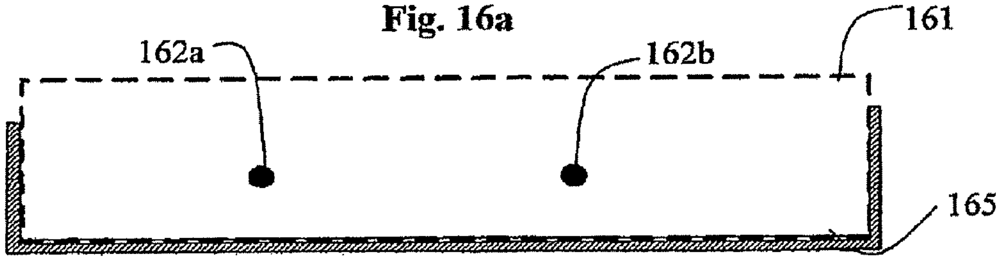
Fig. 16b
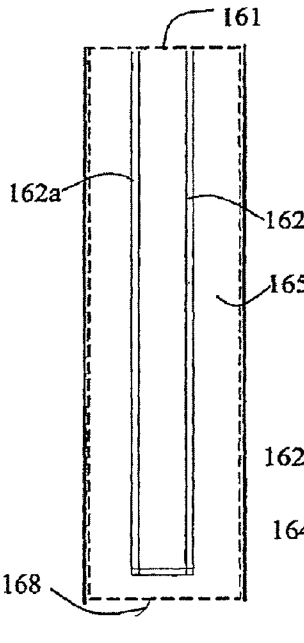
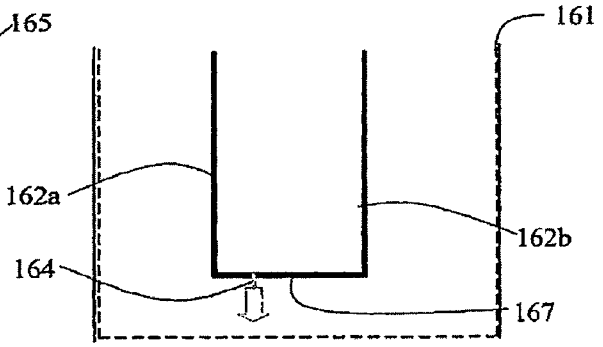
Fig. 16c
Fig. 16d

MEASUREMENT SYSTEM, MEASUREMENT METHOD AND NEW USE OF ANTENNA

The present invention relates to a system for detecting radio-frequency identifiers (RFID tags). Such a system comprises a reading device and an antenna, which is connected to the reading device in order to produce an exciter signal, and to receive the return signal from the RFID tag caused by the exciter signal, for example, at a UHF frequency. The system makes possible, for example, a wireless and automatic results service.

The invention also relates to a new method.

At present, two different methods are mainly used in a sports results service. The first method is based on the use of active tags (data carriers) and suitable reading devices. Active tags include a battery. When such an identifier is brought close to the antenna of a reading device, the device detects the active tag. Another method is based on an inductive tag system operating in a local field, in which there is a large antenna. With the aid of an alternating-current magnetic field the reader induces power in the passive tag and simultaneously communicates with the tag.

Active tags are relatively expensive and have a limited operating life. They typically contain a lithium battery. Active tags are not suitable for mass events, due to their high price (typically € 60 . . . 100) and large size. The lithium batteries make such identifiers environmentally detrimental. Inductive-tag technology too has many drawbacks. The creation of a magnetic field requires a reading device that consumes a great deal of energy, and a large copper coil. For example, a 1×4 $m^2$ detector mat weights 20 kg and requires large batteries to operate. This solution is also expensive, as many detector mats are needed, depending on the number of intermediate timing points and width of the track. A 10-meter wide track will require up to 80 kg of copper for each measuring point. In this solution, the passive tag itself is environmentally friendly. The reliability of this technology is also poor. Attempts have been made to improve it by increasing the number of mats.

An example of an RFID-results service system operating in a local field is disclosed in WO publication 2004/104961. It uses two frequencies, selected from the ranges 100-150 kHz and 1-15 MHz. The first frequency is used for wireless power transmission and the second for signalling.

The website http://trolleyscan.co.za has a description of a multi-antenna system for timing functioning at the UHF range. It uses two transmitting antennae and a single receiving antenna. However, such a system is difficult to transport, while its use of several separate antennae prevent it from achieving good position-differentiation ability.

In sports applications the special requirements of a timing system include precise determining of time, ease of transportation, cheapness, and reliability. A particularly important factor in this is the antenna located at the start or finish line, or at an intermediate timing point, which will permit reliable detection and also produce a radiation pattern enabling precise timing.

Two examples of an RFID system intended for sports applications are disclosed in WO publication 2004/104961 and US publication 2004/0100566. However, these do not disclose antennae suitable for precise timing.

The invention is intended to eliminate the defects of the state of the art referred to above and for this purpose create a new type of cost-effective detection system based on radio technology, which will be suitable for use, for example, as a results-service system.

The invention is particularly intended to create an antenna system, which can be used to replace the widely used inductive systems, for example, which are expensive and heavy.

The invention is based on the idea of using as identifiers UHF-range (300-3000 MHz) radio-frequency identifiers, and an antenna connected to them, which comprises a linear leaky waveguide. The linear leaky waveguide can be implemented, for example, by the microstrip type, by placing a long wire-like conductor on top of a ground plane running essentially parallel to it. The antenna module of the system preferably includes such a ground plane connected to the conductor, but the conductor can also be connected to existing conductor materials at the point of application, in order to form a ground plane. The ground plane causes the identifier detection zone created by the antenna to be concentrated in a smaller area in the vicinity of the waveguide.

We use the term a ‘long’ waveguide to refer to a waveguide that is several times longer than the wavelength used, preferably at least three and typically at least six times the length of the wavelength used. The waveguide can be as much as fifty times the length of the wavelength used, or even longer.

More specifically, the system and method according to the invention is characterized by what is stated in the accompanying claims.

Considerable advantages are gained with the aid of the invention. The advantages are achieved by exploiting an elongated leaky waveguide, which will provide an advantageous field pattern in an RFID application. In many applications passive systems are superior, due to the cost-effective and maintenance-free tags. The limited reading distance, which is often seen as a limitation in passive systems can, with the aid of the antenna solution according to the invention, be turned into an advantage in applications requires positioning precision, because the detection of a tag will show that it is inside a specific area. The reader's antenna, the radiation pattern from which should have the desired shape, will then be a key factor in terms of the spatial positioning precision.

The antenna technology according to the invention is energy efficient, due to the low power required by the UHF reader, compared to inductive systems and, on the other hand, to the good radiation efficiency of a leaky waveguide antenna. The good radiation efficiency permits a large reading distance and good repeatability of the reading event. Thanks to its low total consumption, the antenna can be used with relatively small batteries, so that timing points based on the antenna technology disclosed can be easily placed in terrain, for example.

The new antenna according to the invention permits the utilization of tags that are already on the market. The antenna can be connected to existing reading devices, thus allowing existing data-transfer technology and computer software to be utilized.

With the aid of the long leaky wavelength guide, which includes a ground plane, the power of the radio field can be directed very optimally away from the ground plane, at a direction at right angles to the longitudinal direction of the waveguide. This property is very advantageous in applications, in which the movement of the object being detected is linear in the vicinity of the antenna and the one-dimensional direction of the movement is known. Such applications include many monitoring applications (result services) for sports performances, as well as several warehouse-management or road-traffic control applications.

One major advantage of the system presented is that the radiation pattern of the wire-like antenna means that the power fed to the antenna is distributed relatively homogeneously over a large area, compared to, for example, point-like antennae.

However, the antenna can consist of a single antenna element, which can, for example, be such that it can be rolled up or folded. It will therefore be easy to move and place, for example, at the start, finish, or intermediate timing points of sports events. Smaller antenna elements can also be implemented, which can be connected to each other according to the desired size of the detection zone.

The general advantages of the solution according to the invention are that a line-of-sight connection is not needed to read the tags and that they can generally be read through non-metallic materials. The tags can also easily withstand high temperatures and other changes in ambient factors. In addition, the information contained in the tags can typically be both read and edited (written). Particularly passive tags are cheap and in the future they can be installed anywhere, for example, laminated in a ski or running shoe already at the factory.

A person can also acquire an RFID in connection with some sports event, in which case their personal information will be programmed into the RFID. This will facilitate the work of the organizer in all subsequent sports events, as the RFID will only need to be identified or reprogrammed for the competition in question.

The area in which the power is absorbed from the power radiated by the reader antenna is sufficient to exceed the threshold value of the identifier, is referred to in this document at the detection zone. The technique disclosed is particularly suitable for creating detection zones with a 'rectangular' projection parallel to the ground plane. Thus the antenna type is designed especially for applications, in which the length (the dimension at right angles to the direction of movement of the object) of the desired detection zone is at least 8 times greater than its width (the dimension in the direction of movement of the object). This will achieve a particularly great advantage over known solutions if the length of the desired detection zone is at least 20 times its width. However, with the aid of the technique presently being examined, it is possible to build antennae that produce a rectangular detection zone, with a ratio between its sides of up to 1:100.

Figure 2A:
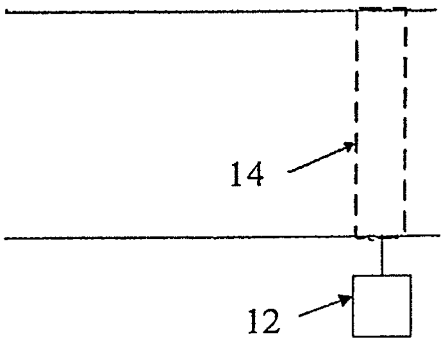
Figure 2B:
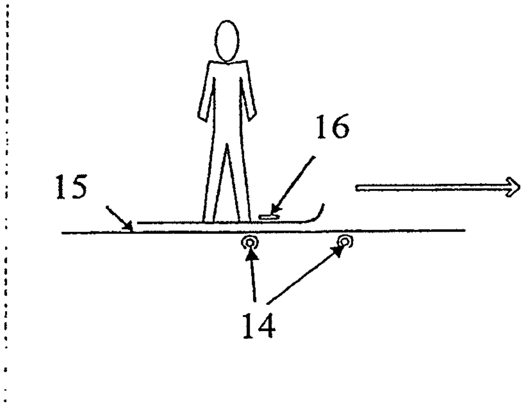
Figure 3:
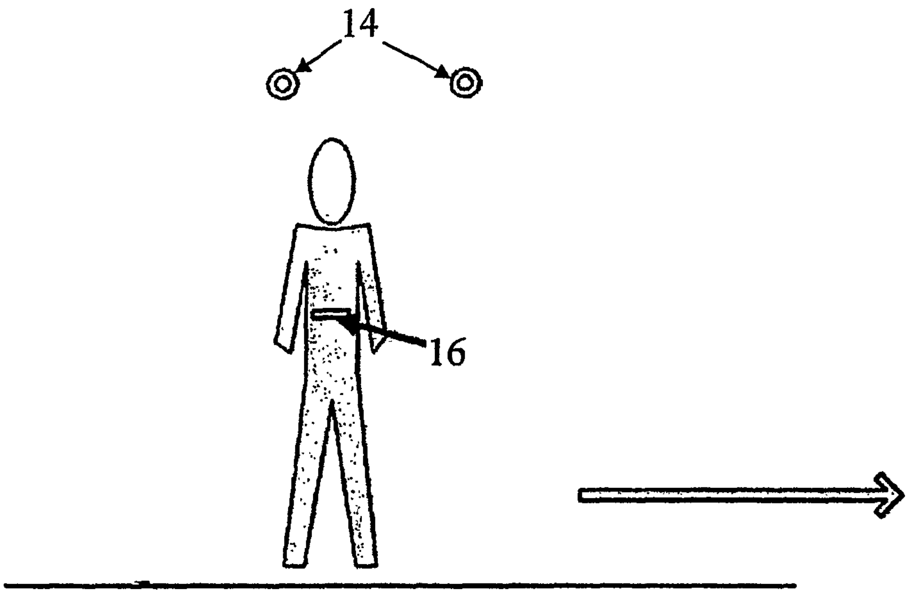
Figure 11:
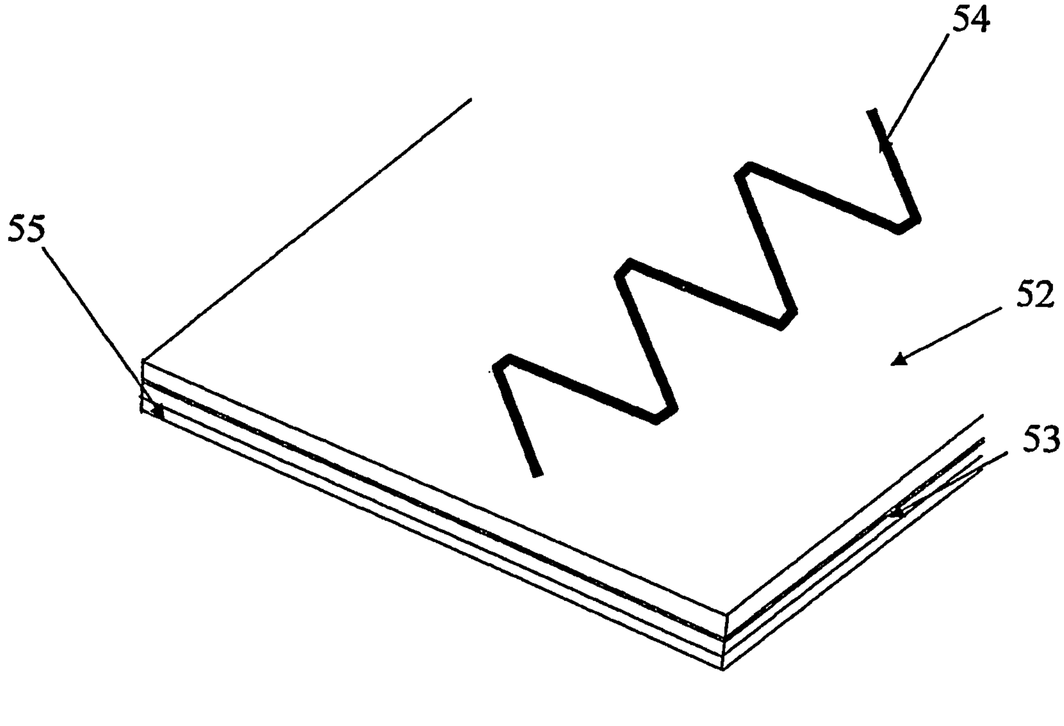
Figure 12:
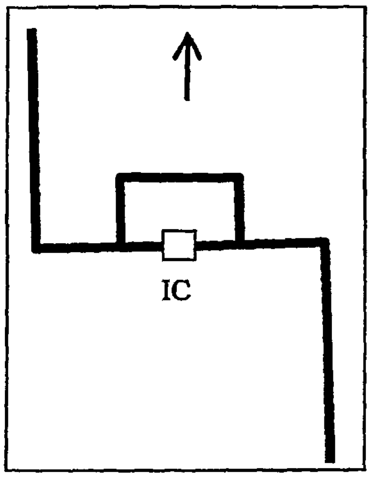
Figure 13A:
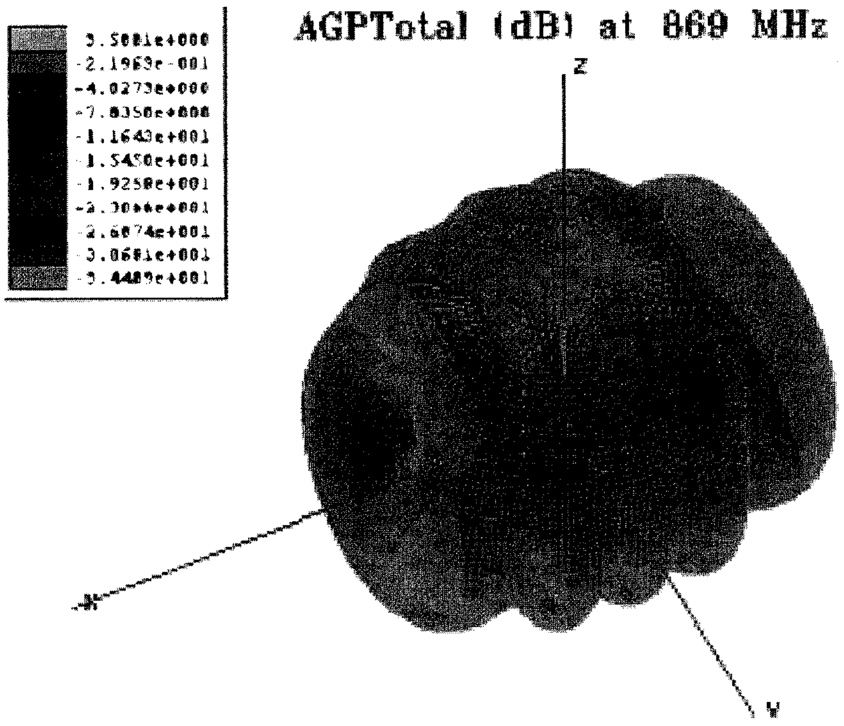
Figure 13B:
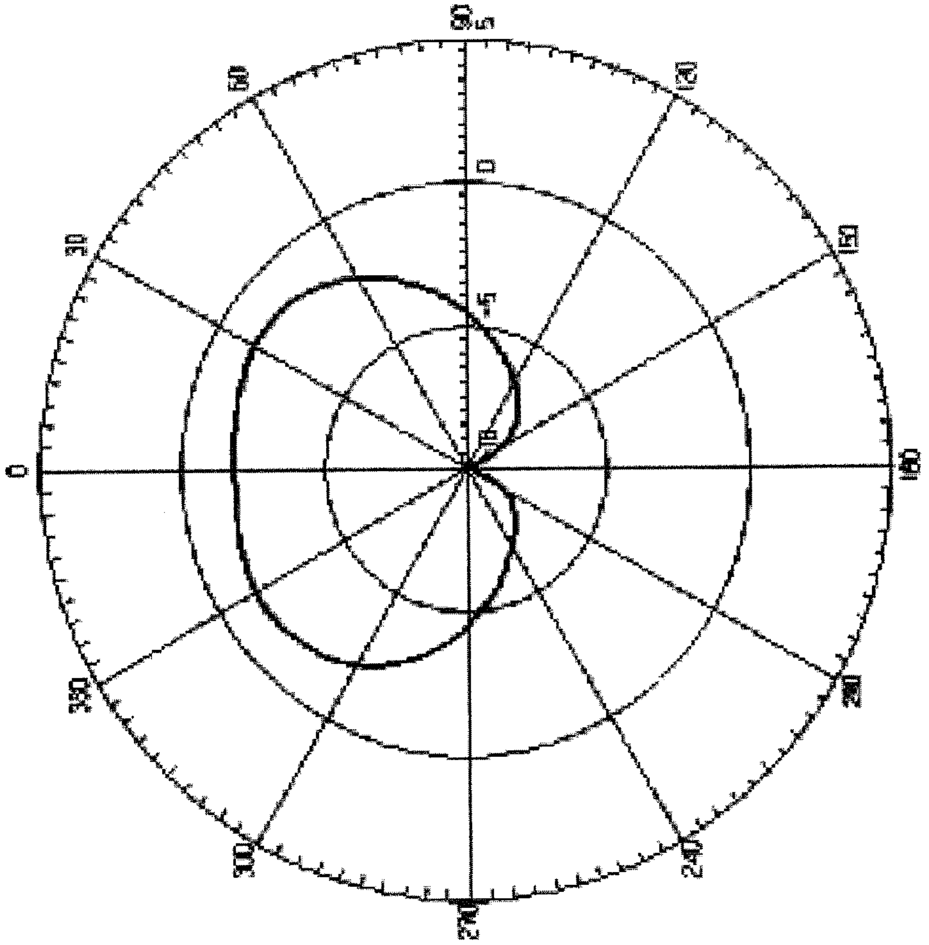
Figure 14A:
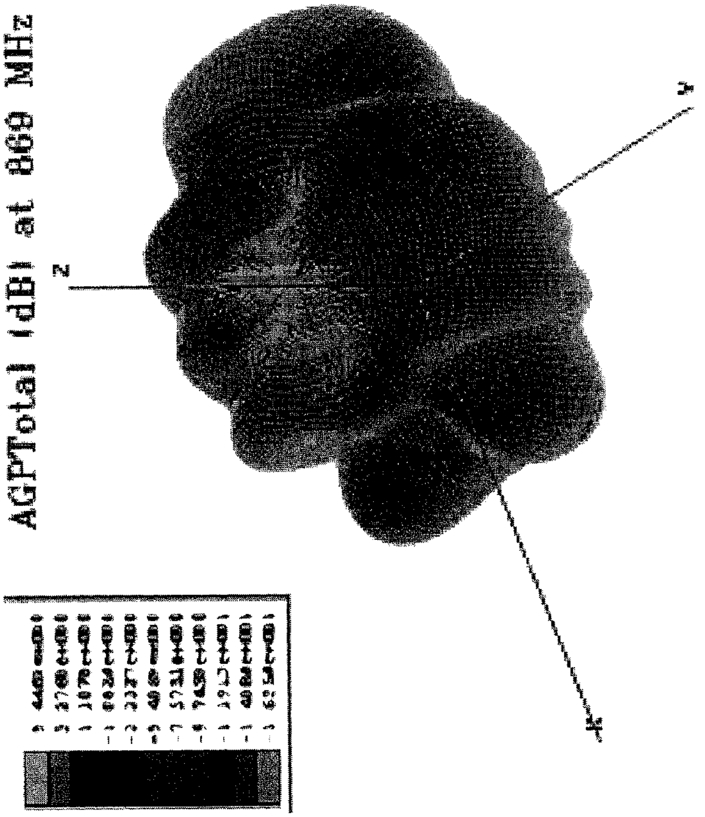
Figure 14B:
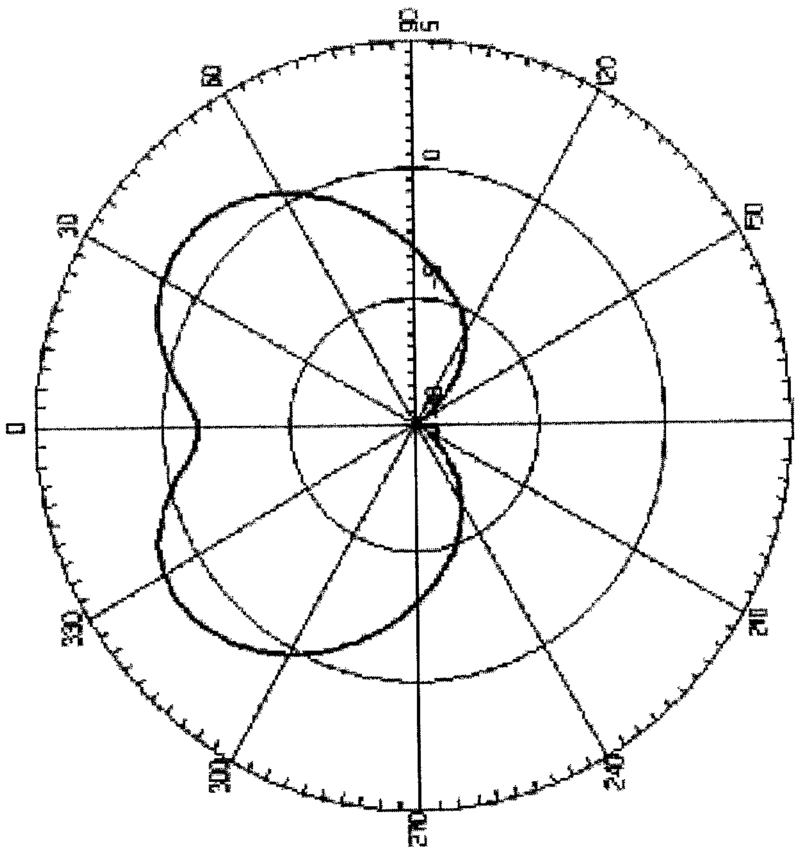
Figure 15A:
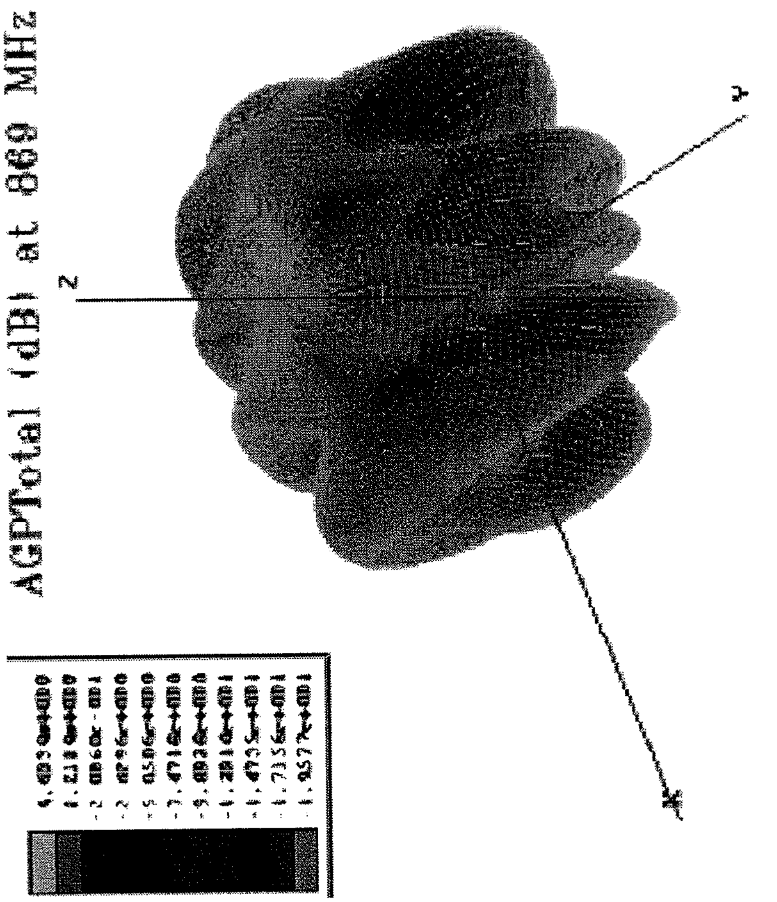
Figure 15B:
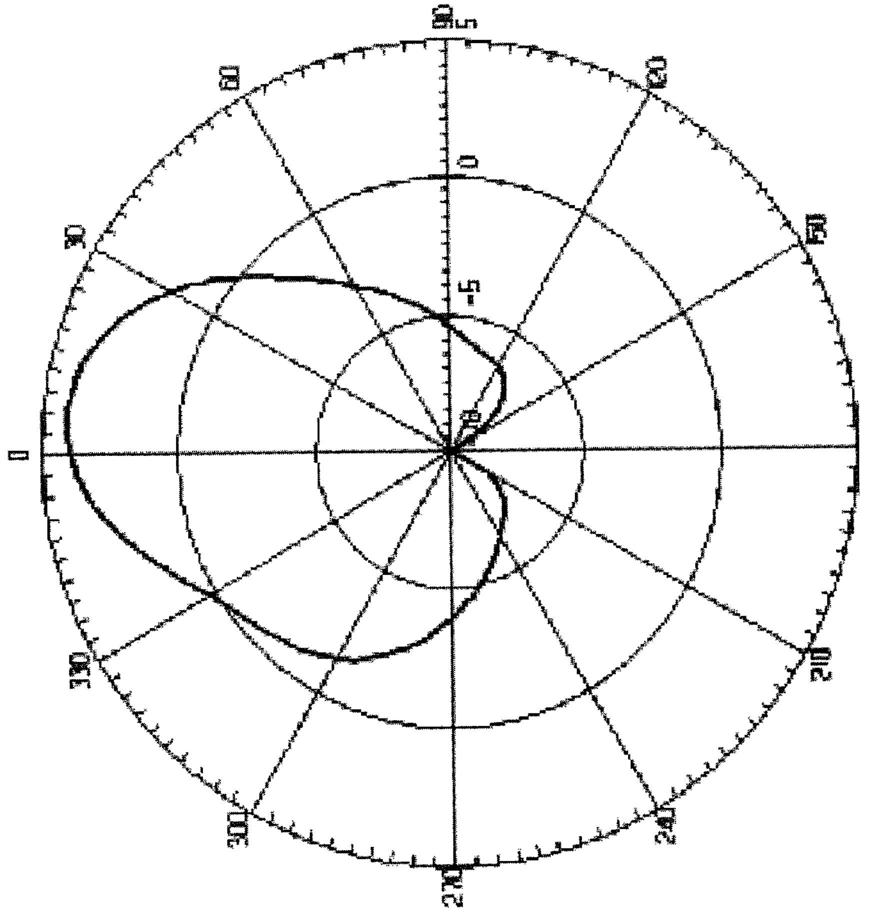

In the following, the invention is examined in greater detail with reference to the accompanying drawings, in which FIG. 1 shows a competition track, in which there are several measuring points, FIGS. 2*a* and 2*b* show separate top and side views of examples of locations of the antenna and RFID in a skiing application, FIG. 3 shows a side view of an example of the location of the antenna and an RFID in a running/walking event, FIGS. 4-10 show perspective views of various antenna configurations, FIG. 11 shows a perspective view of an antenna module structure according to the one embodiment, FIG. 12 shows one possible type of identifier for use particularly in a skiing application, FIGS. 13*a* and 13*b* show perspective and profile views of a radiation pattern of a single-wire antenna, correspondingly, FIGS. 14*a* and 14*b* show perspective and profile views of a radiation pattern of a double-wire antenna, correspondingly, FIGS. 15*a* and 15*b* show perspective and profile views of a radiation pattern of a double-wire phased and tapered antenna, correspondingly, and FIGS. 16*a*-16*d* show various cross-sections of an antenna-module construction comprising a microstrip-type leaky waveguide, according to one embodiment.

According to a typical embodiment, use is made of the UHF frequency range 865-928 MHz which is widely used in RFID technology. Higher or lower frequencies can also be used. The leaky waveguide makes it possible to operate in a remote field. The waveguide acts as both a transmission and reception antenna, thus eliminating the need for separate antennae.

In a results-service application, the system preferably includes an RFID-tag reading device connected to a data network, tags worn by the competitors, and a specially designed antenna, which permits a tag to be read immediately it has crossed the finishing line or passed an intermediate timing point. Once a sportsperson has crossed, for example, the finishing line, the reading device combines the sportsperson's identifier data with the precise time that the tag was detected. Thus, the person and the time are registered in real time. The reading device forwards these data over a data network for further processing.

FIG. 1, which is important for understanding the totality, illustrates the use of the system according to the invention in a sports competition. In the figure, the reference number 5 refers to the competition track, which can be, for example, 4-8-meters wide. The reference number 18 refers to a measuring point, in which there is a leaky-waveguide antenna and a reading device, as well as preferably also a wireless modem for transferring data to the results-service centre. Though FIG. 1 shows mainly a skiing competition, it can be applied directly to any competition event. The data carrier (identifier) travels with the competitor along the competition track and thus a precise time and position can be obtained for the competitor when the data carrier passes, typically passes over or under, an antenna.

FIGS. 2*a* and 2*b* show a skiing or biathlon competition as two separate cross sections. FIG. 2*a* shows the location of the antenna 14 on the track. Item 12 is a reading device associated with the antenna. FIG. 2*b* shows more detail of the locating of the antenna 14 under the performance base 15. In this example, the tag 16 is attached to the surface of the ski. In the figure, the antenna is double-wire, but a single-wire antenna could equally well be used, as will be explained later in greater detail.

FIG. 3 illustrates the utilization of an antenna 14 in a running competition, when it can be located above the object to be detected. In this case, the tag 16 is on the body of the competitor.

Available UHF systems that are technically suitable within the scope of the invention include the ISO-18000-6 standard, the Tagidu (Atmel), and the EPC (Electronic Product Code) standards. One advantage of the Tagidu is that because of its power-economic communications protocol a long reading distance and large tag memory are available. A drawback is its anti-collision protocol, which is slower than that of other systems. The ISO 18000-6 standard is becoming common and has broad support in reading devices and a fast anti-collision protocol, but a shorter reading distance than the Tagidu at the same reader power. A particular advantage of the EPC is the fastest anti-collision protocol—in theory up to about 1000 tags per second, in practice often several hundred tags per second. This makes it suitable for even large mass events. In the EPC there is, however, a small tag memory and a shorter reading distance than the Tagidu at the same reader power. However, especially in terms of timing the EPC standard has advantages. The ISO 18000-6 standard can be regarded as a good alternative.

As the antenna is not protocol-dependent, several different reading devices and tags can be used in applications. One suitable reader is the Feig Long Range Reader ID ISC LRU1000, which supports several protocols.

A particularly advantageous feature of the antenna for use in a results-service application is the distribution of a radiation power as evenly as possible in the longitudinal direction of the wire, so that a tag travelling with a sportsperson can be read reliably, no matter at what point the sportsperson crossed the antenna module that lies parallel to the finishing line. We have noted that a long leaky waveguide in various geometries serves this purpose especially well. Within the scope of the present document, the term leaky waveguide also refers to antenna groups and meandering-line type antennae.

A commercial coaxial cable intended for communications systems has proven to operate relatively poorly in a system according to the present document. Thus, the leaky waveguide is preferably non-coaxial. The waveguide typically comprises an essentially flat ground plane. With the aid of a separate ground plane, even in the case of a non-coaxial cable the radiation pattern is strongly aligned while, according to tests, achieves a detection-zone shape that is more advantageous than coaxial solutions. The conductor wire can be circular in shape, or have a shape differing from the circular, for example, a rectangular (strip-shaped) cross-sectional profile. Stated in general terms, a leaky waveguide thus comprises a ground plane, and a radiating element in an insulating layer on top of the ground plane, which can be a straight or patterned wire or strip. The insulating layer can be a solid substance, such a polyethylene or PTFE (Teflon), but it can also be air.

We have observed that a microstrip-type antenna is well suited to be the antenna. Such an antenna is terminated discontinuously (open/short-circuit) and comprises at least one conductor with several wavelengths. Its radiation pattern is thus formed in strips due to the standing wave motion, which cause undesirable minimum points to the reading distance, depending on the point of examination along the wire. In several applications, the radial radiation of the wire should, in fact, be directed in the narrowest possible beam in one direction (in practice upwards), in which case the reading distance can be maximized through the growth in the field brought by the directability. In addition to the directability of the wire relative to the fixed ground plane, it is possible to exploit various wire geometries. Specific geometries and waveguide constructions are presented later in the examples. The following is a general description of suitable waveguide constructions and geometries.

According to one embodiment, when viewed from above the waveguide is essentially straight and consists of a single wire. One variation of this embodiment is one in which the waveguide is located at a constant distance from the ground plane for essentially the whole length of the conductor. According to a second variation, the waveguide is essentially tapered towards the ground plane over its entire length (at one end farther from the ground plane and at the other end closer to it, typically entire attached to the ground plane). The impedance of such an antenna varies in the longitudinal direction of the wire. According to a third variation, the waveguide is partly tapered (terminating in a taper). Such a geometry provides a particularly even wave pattern.

According to a second embodiment, the antenna is two-wire. The antenna wires are then set parallel to each other and the geometries of the preceding embodiment can be applied separately to both. Parallel antenna wires provide a longer reading area in the direction of movement, which can be an advantage in specific applications. The wires are connected to each other at the feed end and are feed from this common part preferably from a point that permits a phase shift between the wires of one-quarter of a wave. In this way the wires can be fed in the same phase. The phase differences compensate each other and the radiation pattern becomes especially even. The number of wires can, if necessary, be increased at half a wave from each other. The wires can be connected separately to the ground, or they can form a loop.

According to a third embodiment, the antenna conductor meanders (for example, it is 'saw-edge shaped'), in which case a field polarization component will be created in the direction of movement too. This permits the use of different kinds of tags and new possibilities for locating the tags.

In the direction of movement of the sportsperson, the ground plane has preferably a dimension of a least 20 cm, and typically at least 40 cm. The waveguide-wire or wires is (are) generally located symmetrically on top of the ground plane. In the longitudinal direction, the ground plane extends at least to the level of the ends of the waveguide wire, and preferably 1-20 cm beyond them. This will achieve an optimal alignment also in the vicinity of the extreme ends of the wires.

The waveguide can be positioned at a fixed distance from the ground plane, or at a distance that varies locally. The distance will affect the impedance and radiation pattern of the antenna. Seen from the feed point, the impedance is typically arranged directly to the impedance of the reading device, typically at 50 or 75 Ohm. The waveguide is typically fed from one end of the wire (wires), the other end (ends) being connected to the ground plane (to the ground plane and/or to each other).

FIGS. 16*a*-16*d* show an example of a two-wire phased and tapered antenna module. The antenna wire is marked with the reference number 162 and comprises a straight zone 163*a* and a tapered zone 163*b*. The wires are marked with the reference numbers 162*a* and 162*b*. The insulating layer, in which the antenna wire is embedded, is marked with the reference number 161. The ground plane 165 can be attached to the second surface of the insulating layer 161. The antenna wires 162*a* and 162*b* are fed (read) from their common terminal part 167 from the signalling point 164. When the antenna module is used, the signalling point is connected to the coaxial feed cable 168.

The radiation of a wire of finite length always has a component parallel to the wire at each end of the wire. In addition, even the radial radiation of the wire is not homogeneous along the length of the wire, but instead minima and maxima appear in the radiation. This is due to wire's standing waves. Besides optimizing the radiation properties of the antenna, an essential design objective is the simplicity of the construction and through it both a low price for, and easy movability of the device.

Applications should attempt to have the polarizations of the reader and the tag parallel to each other. For example, in a skiing application when integrating a tag with a ski the optimal installation alignment in terms of its operation will generally be one in which the polarization of the tag is parallel to the ski. The antenna of FIG. 10 will be best suited to this case, as the polarization of the other straight antenna types shown is parallel to the wire. On the other hand, when wishing to manufacture an antenna for general use, which can also be suspended above the finishing line, it may be worthwhile manufacturing a straight antenna, which will optimalize the reading distance to a tag with the same polarization. In a skiing application, the reading distance required is significantly shorter than in other applications, which can be taken into account by aligning the ski tag in such a way that the antenna of the tag also has a transverse component, even though it may be shorter than that in the longitudinal direction. An example of a tag of this type for integration in a ski is shown in FIG. 12.

In all of the antenna types described, a metal ground plane is utilized beneath the actual radiating element. The metal foil or mesh, which can be, e.g., of copper or aluminium, to be used as the ground plane, need not be thick. Even a layer with a thickness in the order of magnitude of the depth of penetration of the wave will achieve sufficient grounding. For typical UHF frequencies and using copper foil, at layer of even about 2 μm will be sufficient.

Taking into account the principles described above, it is possible to manufacture a light antenna module, which can even be rolled up. However the preservation of the properties of the antenna requires the distance between the ground plane and the actual antenna pattern to remain unaltered as far as possible. In addition, if the antenna pattern is sunk into the ground, a free space should be ensured above it, or else it should be filled with a material, the effect of which has been taken into account in the design of the antenna. If the antenna is suspended in the air, this requirement does not apply. FIG. 11 shows one possible construction for positioning the antenna conductor and the ground plane relative to each other. In it, the conductor wire is marked with the reference number 54 and the ground plane with the reference number 55. The conductor wire is attached to the first insulating-material layer 52 and the ground plane to the second insulating-material layer 53. When the layers are placed on top of each other, the ground plane and the conductor will be positioned at the desired distance from each other. The insulating-material layers 52 and 53 act as both support and shield structures. The filler materials can be, for example, of semirigid foam plastic, which will provide support and protect from moisture, while also being able to be rolled up. Further, by gluing, for example, copper foil 55 on the filler 53 and to the foil or wire 54 incorporating the antenna pattern, it will be possible to transport the antenna as two rolls. Of course, the module can also be implemented in such a way that the insulating material consists of a single unified layer, in which case the entire modules can be moved at the same time. In addition to a structure that can be rolled up, rigid or even foldable structures are also possible.

The electrical properties of the antenna can be improved by connecting several antennae to form a group.

It will be advantageous for the reading device used in the system to have a connection for an external antenna. In addition, it should support single-antenna operation (not separate transmission and reception antennae). A general 50-Ohm RF interface, to which the new antennae depicted in this document can be fitted will also be advantageous. Thus separate calibration will not be required according to the antenna, antenna cable, or operating environment.

Particularly in results-service operation, the measuring system comprises results-service software in addition to an antenna, a reading device, and an RFID. The software can be run on a computer connected to the reading device. Such a system will be able to detect a passive RFID when it passes over or under the antenna, as well as to determine the precise moment in time of the crossing. In addition, the system will be able preferably to read and distinguish several different events (anti-collision) and typically the system will be able to record the data in the memory of the computer for further processing. As described above, the system's antenna is a long and wire-like leaky waveguide (micro-strip type leaky waveguide), or antenna groups consisting of individual elements, such as dipoles, micro strips, or meandering lines. Such a measuring system generally comprises several reading devices and antennae, which are correspondingly connected to each other for transmission and reception, a central computer, and means for transferring data wirelessly or over a wire to the central computer for storage.

EXAMPLE 1

Experimental Testing

Because a sufficient power supply to the reading device from the radiating field is a critical factor in terms of the operation of a passive RFID tag, the operation of the prototype antennae was evaluated by measuring the field strength close to them, when a signal source had been connected to the prototypes to feed an RF signal at a constant power and frequency. By moving a spectrum analyser connected to the receiver antenna close to the antenna, information was obtained on the field strength at the corresponding point. In connection with the most promising constructions, the result of the field-strength measurement was using a practical reading test, in which the reading device was connection through an adapter circuit to the antenna prototype and the maximum distance between the antenna and the tag, at which the reading of the tag succeeded, was measured. In all measurements, the antenna was adapted as precisely as possible to the impedance of the signal source and the remaining part of the attenuation caused by the impedance adaptation was eliminated from the measurement result, as was also the gain of the reception antenna used. After these corrections, the attenuation between the source and the tag was obtained, which could be compared with the reading distance of the system when used with a traditional antenna. The typical maximum reading distance using a Palomar system (Tagidu circuit) at a frequency of 869 MHz and a power of 0.5 W is 4 m. From this it is possible to calculate the maximum attenuation permitted by the system as being about 41 dB (as the boundary value of the detection zone. The method of defining the radiation power (ERP) was taken into account in the calculation.

First of all, the suitability of a commercial leaky coaxial cable for the purpose was investigated. The first hypothesis was that a length of this cable might work in the desired manner, if a standing-wave motion was induced in the cable by terminating the cable by short-circuiting it, or leaving it open. For this purpose, 20 meters of 'NK Cables RFXK' cable (diameter 1¼") were acquired. The cable was used as a resonator type, by terminating it in a non-matched manner, because by using matched termination most of the power would have been lost in the terminal resistance. A leaky coaxial cable radiates through openings made in its cover. In addition, measurements were made from a variation made from this, in which half of the cable's cover was removed to improve the radiation ratio. A similar split test construction was also made from a conventional 75-Ohm coaxial cable, which is used, for instance, in television networks in buildings.

A microstrip-type waveguide antenna was made as a second construction prototype, in which a 3-mm copper conductor, with a length of 3900 mm, was stretched on styrox supports with a height of 10 mm, on top of a copper film with a size of 4000 mm*460 mm, for use as the ground plane.

The measurement results are shown in Table 1. As can be seen from the results, in these tests a sufficiently small attenuation (limit 41 dB) was achieved only with the aid of the microstrop antenna. This was confirmed with a test made with the aid of a reading device, in which Palomar foil tags equipped with Atmel's Tagidu circuits were used with an Idesco reader (R8000), which was known to operate optimally. Tags made by Rafsec according to Philips' ISO 18000-6 standard were used with a Feig reader. In the light of the results, the optimality of this sticker-type of tag is questionable. This is because with a greater transmission power a greater reading distance should be achieved with a Feig reader than with an Idesco reader, even though the poorer power efficiency of the ISO 18000-6 compensates for this.

| | | antenna | | | | | | | |
|---|---|---|---|---|---|---|---|---|---|
| NK Cables | | attenuation (dB) | | | | reading distance (dB) | | | |
| RFXK | | 1 m | | 0.5 m | | Idesco | | Feig | |
| terminated | 20 m | 60 | 70 | 55 | 65 | no | no | — | — |
| short-circuited | 20 m | 58 | 70 | 52 | 66 | no | no | — | — |
| short-circuited | 4 m | 52 | 60 | 48 | 58 | closed | closed | — | — |
| stripped | 4 m | 28 | 57 | 45 | 50 | closed | 0.5 | — | — |
| short-circuited 75-Ohm coaxial | | 49 | 53 | 45 | 50 | — | — | — | — |
| microstrip | | 37 | 43 | 35 | 40 | 0.5 | 2 | 0.2 | 1 |

EXAMPLES 2-9

Antenna Simulations, FIGS. 4-10

Various wire antenna geometries were simulated, in order to determine the radiation properties and feed impedances of the antenna structure. In the simulation models, about three-wavelength sized antennae were used, which is sufficient to reveal the phenomena appearing in the antennae, such as foliation of the radiation pattern caused by the standing wave (period length half a wavelength). In FIGS. 4-10, the reference number 44 refers to the antenna conductor (resonator part) and the reference number 47 to the ground plane. The antenna is preferably fed and read from the signalling point, which is located at the end of the conductor (in the case of two wires, at the conductor piece normal to the conductors, in the vicinity of the ends of the wires), but the signalling point can also be located at some other point.

EXAMPLE 2

Figure 4:
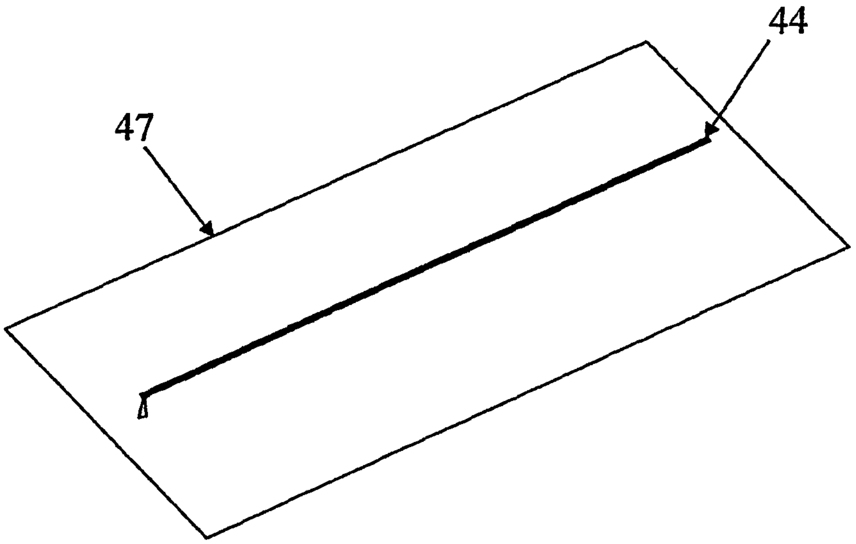

Straight Conductor with Open End, FIG. 4

This is a straight single-conductor and simple construction, the operation of which was confirmed by experimentally. It is easy to manufacture, but a greater problem is foliation of the radiation pattern, as appears in the measurement results and the field images. The antenna is relatively narrow-band.

EXAMPLE 3

Figure 5:
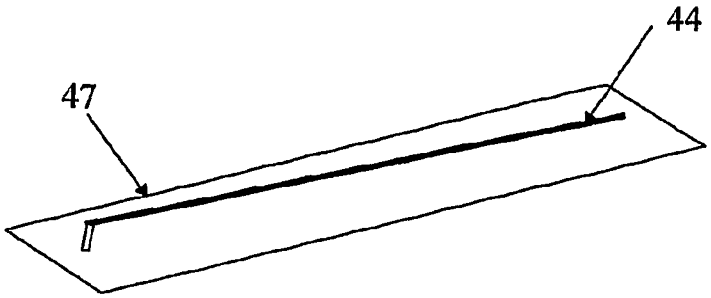

Straight Variable-Impedance (Tapered) Conductor, FIG. 5

In this antenna, the distance of the antenna wire from the ground plane changes evenly, until the wire makes contact at its far end with the ground plane. The radiation pattern is not foliated, but the radiation is concentrated in the centre of the wire and is weak especially at the far end of the wire.

EXAMPLE 4

Figure 6:
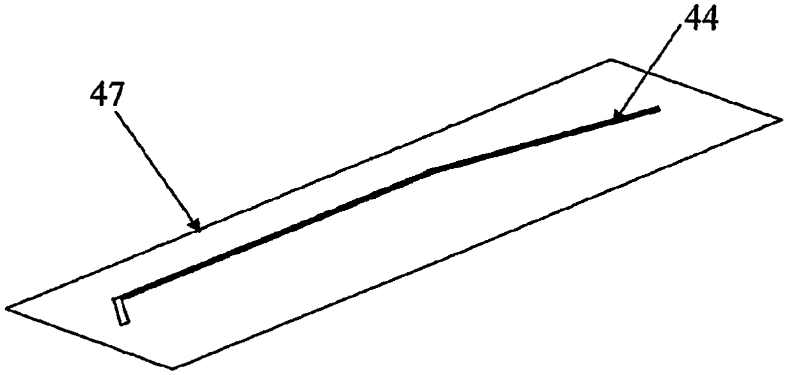
Figure 7:
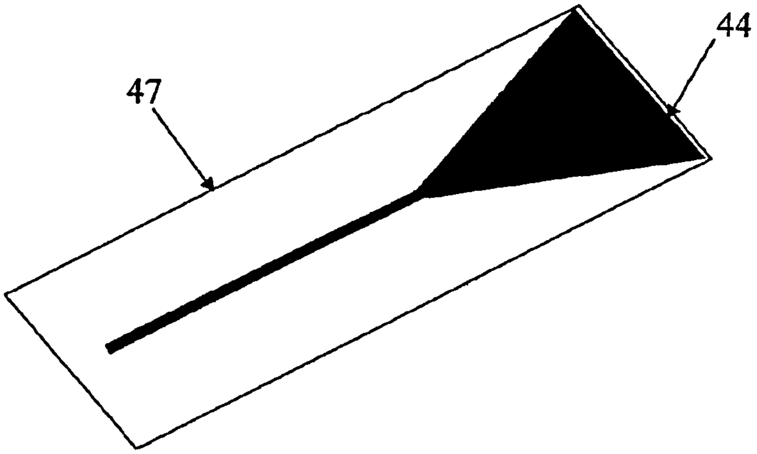

Straight Tapered Terminated Conductor, FIGS. 6 and 7

A compromise between those above. By tapering over about a wavelength, the standing wave in the antenna is attenuated and thus the waves in the radiation pattern are flattened. The antenna is also relatively broadband. An alternative way to implement tapering is with the aid of a planar structure. Instead of the conductor approaching the ground plane, it can be broadened in its original plane, until this makes contact over it full width with the ground plane. The implementation of good displacement requires a quite broadly widening conductor (FIG. 7). The corners of the end tend to radiate in the direction of the wire, thus wasting power from the useful direction, for which reason the construction is not optimal. The simulated radiation pattern of a tapered single-wire antenna according to FIG. 6 is shown in FIGS. 13*a* and 13*b*.

EXAMPLE 5

Figure 8:
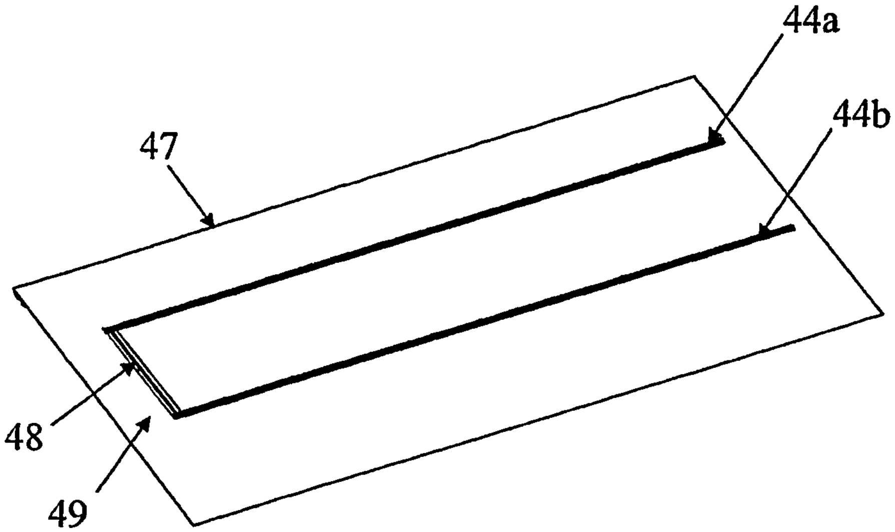
Figure 9:
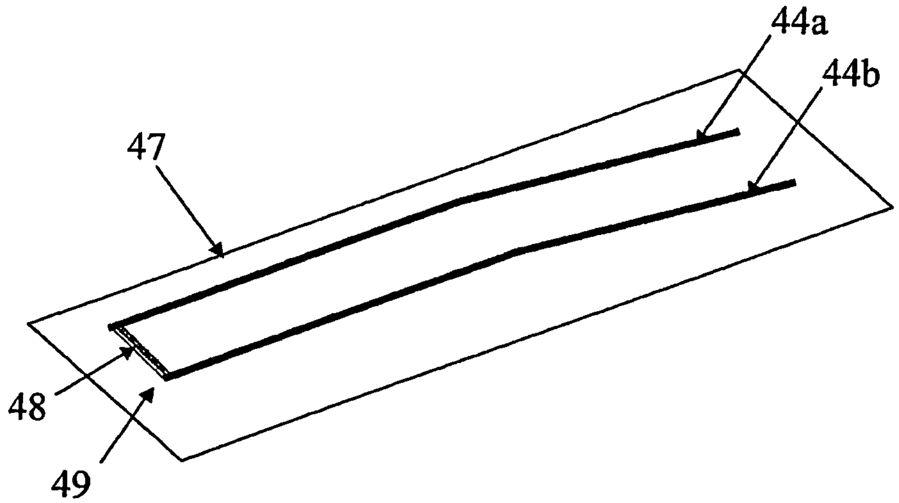
Figure 10:
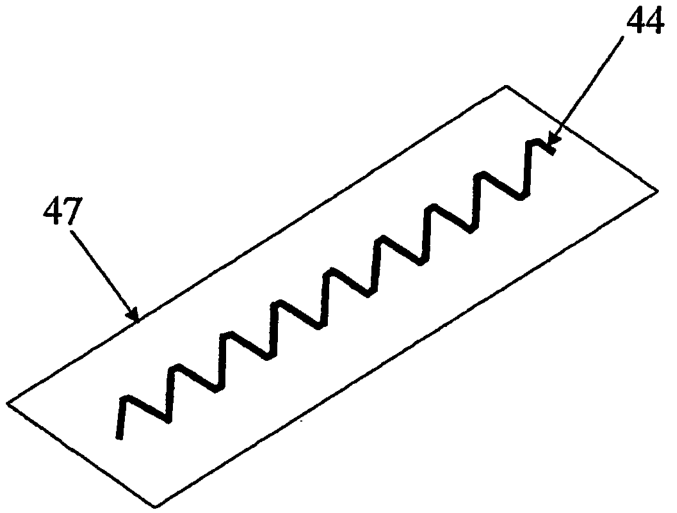

Two-Wire Antenna, FIGS. 8 and 9

By feeding simultaneously two parallel wires at a distance of half a wave from each other, a beam that is divided in two is created. By exploiting this phenomenon, it is possible to achieve, if desired, a long reading area in the direction of travel of the sportsperson, though at the expense of the vertical reading distance. The antenna wires are marked with the reference numbers 44*a* and 44*b*. The conductor piece joining the wires is marked with the reference number 48 and the signal point with the reference number 49. The simulated radiation pattern formed by a two-wire antenna is shown in FIGS. 14*a* and 14*b*. It will be seen from the figures that a weaker field area is formed in the centre of the detection area.

EXAMPLE 6

Two-Wire Phased Antenna, FIG. 8

Externally the same as in Example 5. Exploits the idea of the previous construction, in order to create the maximum gain in the main radiation direction. In addition, the radiation maxima and minima compensate each other, the result being a relatively even response. Implemented by feeding the wires, which are half a wave from each other, at a quarter-wavelength's phase-shift relative to each other. In practice this is implemented by selecting the feed point from the common part of the wires, in such a way that the phase condition is met. Gain can be increased and antenna's beam narrowed by adding to the construction parallel one-way wires at a distance of a half wave, but this will increase the width of the antenna and reduce the position-definition precision of the antenna significantly.

EXAMPLE 7

Two-Wire Phased and Tapered Antenna, FIG. 9

A combination of the constructions of Examples 4 and 6, and a combination of their properties. The result is an extremely even response on top and a large degree of alignability. The same design points of view apply as in Example 6. The simulated field pattern of the two-wire phased and tapered antenna is shown is FIGS. 15*a* and 15*b*. From these it can be seen that the field pattern is strongly directed to the upper side (away from the ground plane), which makes this embodiment particularly advantageous in applications demanding precise detection.

EXAMPLE 8

Two-Wire Antenna, FIG. 14

Basic idea a construction repeating half-wave periods, in which the zero points of the radiation turn to a different polarization relative to the maxima. This achieves evening of the radiation patterns, without tapering that is difficult to implement and a short-circuit that terminates the wire. An additional advantage is that a component parallel to the direction of travel of the sportsperson is obtained for the polarization of the radiation.

Many other embodiments of the invention, differing from those disclosed above, can also be envisaged within the scope of the inventive idea. The invention is not limited to the use of passive tags, or to the antenna geometries described, but instead must be interpreted within the full extent of the accompanying Claims.

The invention claimed is:

1. A measuring system for detecting radio-frequency tags operating at a predefined wavelength, the system comprising a reading device and an antenna, which is connected to the reading device for connecting to one or more radio-frequency identifier (RFID) tags moving in a direction towards said antenna, wherein the antenna has a microstrip configuration and a length which is equal to or longer than a multiple of said predefined wavelength of the one or more RFID tags in order to form a leaky waveguide and an elongated detection zone, said leaky waveguide having the microstrip configuration acting as both a transmission and a reception antenna and being connected to the reading device in order to produce a radio-frequency excitation signal and in order to receive from said one or more RFID tags crossing said elongated detection zone, a return signal powered by the radio-frequency excitation signal, and wherein the antenna comprises:

a long conductor configured like a wire, an elongated ground plane in the vicinity of the long conductor and essentially parallel to the long conductor in order to form said elongated detection zone, and wherein the long conductor is connected at one end to the elongated ground plane.

2. The measuring system according to claim 1, wherein the long conductor comes closer to the elongated ground plane in a tapered manner at least in the vicinity of said one end.

3. The measuring system according to claim 1, wherein the antenna is equipped with a signalling point located essentially at one end of the long conductor, in order to feed radio-frequency energy to the antenna and to lead radio-frequency energy from the antenna.

4. The measuring system according to claim 1, wherein the long conductor is attached at least locally to insulating material, which locks the long conductor's position relative to the elongated ground plane.

5. The measuring system according to claim 1, wherein the antenna is arranged as a module, which comprises a common conductive elongated ground plane, at least one long conductor configured like a wire and located mainly at a distance from the elongated ground plane, and an insulating-material layer, which separates the elongated ground plane and the long conductors from each other.

6. The measuring system according to claim 1, wherein the antenna is arranged to form a module, which is adapted to be rolled up in the longitudinal direction of the antenna.

7. The measuring system according to claim 1, wherein the length of the antenna is at least 3 times said predefined wavelength.

8. The measuring system according to claim 7, wherein the length of the antenna is 6-60 times said predefined wavelength.

9. The measuring system according to claim 7, wherein the length of the antenna is 8-30 times said predefined wavelength.

10. The measuring system according to claim 1, wherein a first dimension of the elongated detection zone produced by the antenna is at least 8-times compared to a second direction at right angles, said dimensions being located in the normal plane of the main radiation direction of the antenna.

11. The measuring system according to claim 10, wherein the first dimension of the detection zone produced by the antenna is at least 20-times compared to the second direction at right angles, said dimensions being located in the normal plane of the main radiation direction of the antenna.

12. The measuring system according to claim 1, which comprises several reading devices and antennae, which are correspondingly connected to each other in the said manner, a central computer, and systems for transferring data from the reading devices to the central computer for storage.

13. The measuring system according to claim 1, which comprises in addition results-service software.

14. The measuring system according to claim 1, wherein the antenna is connected to the reading device in order to produce the radio-frequency excitation signal, and in order to receive from the radio-frequency tag the return signal caused by the excitation signal.

15. A measuring system for detecting radio-frequency tags operating at a predefined wavelength, the system comprising a reading device and an antenna, which is connected to the reading device for connecting to one or more radio-frequency identifier (RFID) tags moving in a direction towards said antenna, wherein the antenna has a microstrip configuration and a length which is equal to or longer than a multiple of said predefined wavelength of the one or more RFID tags in order to form a leaky waveguide and an elongated detection zone, said leaky waveguide having the microstrip configuration acting as both a transmission and a reception antenna and being connected to the reading device in order to produce a radio-frequency excitation signal and in order to receive from said one or more RFID tags crossing said elongated detection zone, a return signal powered by the radio-frequency excitation signal, wherein the leaky waveguide comprises at least two one-way long conductors configured like wires in the vicinity of an elongated ground plane, and essentially parallel to the elongated ground plane, in order to form said elongated detection zone, wherein the at least two one way conductors are electrically connected to the elongated ground plane at one end, and wherein said leaky waveguide further comprises a signalling point, the signalling point located at a point which permits a quarter-wave phase difference in the at least two one way conductors.

16. The measuring system according to claim 15, wherein the long conductor is attached at least locally to insulating material, which locks the long conductor's position relative to the elongated ground plane.

17. The measuring system according to claim 15, wherein the antenna is arranged as a module, which comprises a common conductive elongated ground plane, at least one long conductor configured like a wire and located mainly at a distance from the elongated ground plane, and an insulating-material layer, which separates the elongated ground plane and the long conductors from each other.

18. The measuring system according to claim 15, wherein the antenna is arranged to form a module, which is adapted to be rolled up in the longitudinal direction of the antenna.

19. The measuring system according to claim 15, wherein the length of the antenna is at least 3 times said predefined wavelength.

20. The measuring system according to claim 19, wherein the length of the antenna is 6-60 times said predefined wavelength.

21. The measuring system according to claim 19, wherein the wherein the length of the antenna is 8-30 times said predefined wavelength.

22. The measuring system according to claim 15, wherein a first dimension of the elongated detection zone produced by the antenna is at least 8-times compared to a second direction at right angles, said dimensions being located in the normal plane of the main radiation direction of the antenna.

23. The measuring system according to claim 22, wherein the first dimension of the detection zone produced by the antenna is at least 20-times compared to the second direction at right angles, said dimensions being located in the normal plane of the main radiation direction of the antenna.

24. The measuring system according to claim 15, which comprises several reading devices and antennae, which are correspondingly connected to each other in the said manner, a central computer, and systems for transferring data from the reading devices to the central computer for storage.

25. The measuring system according to claim 15, which comprises in addition results-service software.

26. The measuring system according to claim 15, wherein the antenna is connected to the reading device in order to produce the radio-frequency excitation signal, and in order to receive from the radio-frequency tag the return signal caused by the excitation signal.

27. A method for detecting a radio-frequency (RFID) tag operating at a predefined wavelength, comprising:

radiating power from an antenna in an elongated detection zone sufficient to exceed a threshold value of at least one RFID tag crossing said elongated detection zone, thereby producing a radio-frequency excitation signal, and receiving a return signal powered by the radio-frequency excitation signal from said at least one RFID tag, wherein said at least one radio-frequency identifier (RFID) tag is moving in a direction towards the antenna connected to a reading device, wherein the antenna has a microstrip configuration and has a length which is equal to or longer than a multiple of said predefined wavelength of the at least one RFID tag, forming a leaky waveguide and said elongated detection zone, wherein the antenna comprises:

a long conductor configured like a wire, an elongated ground plane in the vicinity of the long conductor and essentially parallel to the long conductor in order to form said elongated detection zone, and wherein the long conductor is connected at one end to the elongated ground plane.

28. The method according to claim 27, wherein the antenna has a length of at least 3 times said predefined wavelength.

29. The method according to claim 28, wherein the antenna has a length of 6-60 times said predefined wavelength.

30. The method according to claim 28, wherein the antenna has a length of 8-30 times said predefined wavelength.

31. The method according to claim 27, wherein the antenna is arranged as a module, which comprises a common conductive elongated ground plane, at least one long conductor configured like a wire and located mainly at a distance from the elongated ground plane, and an insulating-material layer, which separates the elongated ground plane and the long conductors from each other.

32. The method according to claim 27, being used for monitoring performance of a sportsperson in a results-service system based on radio-frequency tags.

33. The method according to claim 27 being used for warehouse-management.

34. The method according to claim 27 being used for traffic-control.

35. A method for detecting a radio-frequency tag operating at a predefined wavelength, comprising, radiating power from an antenna with an elongated detection zone sufficient to exceed a threshold value of at least one RFID tag crossing said elongated detection zone, thereby producing a radio-frequency excitation signal, and receiving a return signal powered by the radio-frequency excitation signal from said at least one RFID tag, wherein said at least one radio-frequency identifier (RFID) tag is moving in a direction towards the antenna, wherein the antenna is connected to a reading device, wherein the antenna has a microstrip configuration and has a length which is equal to or longer than a multiple of said predefined wavelength of the at least one RFID tag, forming a leaky waveguide and said elongated detection zone, wherein the leaky waveguide comprises at least two long one-way conductors configured like wires in the vicinity of an elongated ground plane, and essentially parallel to the elongated ground plane, in order to form said elongated detection zone, wherein the at least two one way conductors are electrically connected to the elongated ground plane at one end, and wherein said leaky waveguide further comprises a signalling point, the signalling point located at a point which permits a quarter-wave phase difference in the at least two one way conductors.

36. The method according to claim 35, wherein the antenna has a length of at least 3 times said predefined wavelength.

37. The method according to claim 36, wherein the antenna has a length of 6-60 times said predefined wavelength.

38. The method according to claim 36, wherein the antenna has a length of 8-30 times said predefined wavelength.

39. The method according to claim 35, wherein the antenna is arranged as a module, which comprises a common conductive elongated ground plane, at least one long conductor configured like a wire and located mainly at a distance from the elongated ground plane, and an insulating-material layer, which separates the elongated ground plane and the long conductors from each other.

40. The method according to claim 35, being used for monitoring performance of a sportsperson in a results-service system based on radio-frequency tags.

41. The method according to claim 35, being used for warehouse-management.

42. The method according to claim 35, being used for traffic-control.

* * * * *